United States Patent [19]

Lambert

[11] 4,381,522
[45] Apr. 26, 1983

[54] SELECTIVE VIEWING
[75] Inventor: Trevor Lambert, Sherborn, Mass.
[73] Assignee: Adams-Russell Co., Inc., Waltham, Mass.
[21] Appl. No.: 211,759
[22] Filed: Dec. 1, 1980
[51] Int. Cl.³ .............................................. H04N 7/16
[52] U.S. Cl. ........................................ 358/86; 455/4; 455/5
[58] Field of Search ............... 358/86, 84, 116; 455/3, 455/4, 5, 6, 2

[56] References Cited
U.S. PATENT DOCUMENTS

| | | | |
|---|---|---|---|
| 3,211,830 | 10/1965 | Sargent, Jr. ........................... | 358/86 |
| 3,278,677 | 10/1966 | Fannoy ................................. | 358/86 |
| 3,757,225 | 9/1973 | Ulicki ................................... | 455/4 |
| 4,264,924 | 4/1981 | Freeman ............................... | 358/86 |

Primary Examiner—Joseph A. Orsino, Jr.
Attorney, Agent, or Firm—Charles Hieken

[57] ABSTRACT

A cable television system includes a minicomputer that responds to signals from viewers desiring to see particular television program material to provide a schedule video signal that is broadcast over a program schedule channel carrying a video signal representative of television programs to be broadcast, the time of broadcast and the channel where broadcast. The computer also provides selecting control signals that causes a particular television signal source, such as on a video tape cassette, disc or film, to provide a video signal that is coupled by a video switch controlled by switching control signals from the computer for modulating a television transmitter associated with a channel selected for broadcasting the selected television program material. A television signal combiner combines the signals from the different television transmitters for broadcast over a cable to the remote receiving locations. A viewer at a remote receiving location may select a particular television program for viewing by dialing a telephone number to connect the telephone at the remote receiver location by the telephone system to the minicomputer and then dial a number corresponding to the desired program on a schedule made available to each person at the remote receiving locations.

3 Claims, 1 Drawing Figure

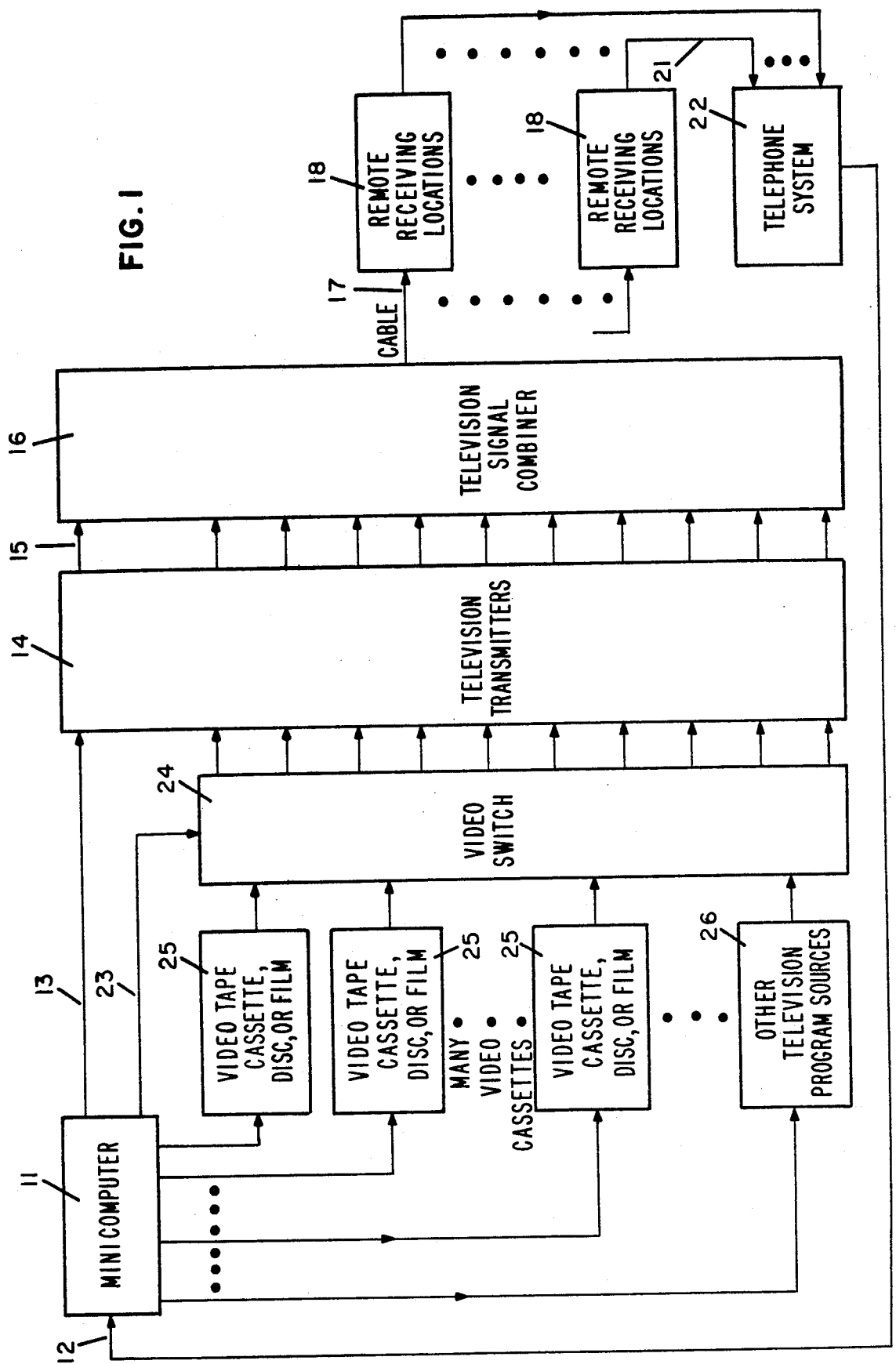

SELECTIVE VIEWING

The present invention relates in general to television viewing and more particularly concerns novel apparatus and techniques for enabling a viewer to conveniently select a particular program of interest and have that program scheduled for viewing shortly after selection over a system that transmits to the public while informing the selector and others who may be interested when and on which channel the selected program may be viewed.

Video information available to the public is on a fixed schedule, forcing viewers to arrange their schedules to meet fixed programming schedules. Alternatively, some viewers may connect expensive video tape recorders to a television set that records a program of interest. The viewer may then play back the recorded program on the television set.

The rigidity of the present system limits consumer advertising to short commercial messages often measured in seconds and seldom more than minutes that provide the consumer little, if any, useful information about the product or services being offered.

Some experimental systems use video text information that may be requested instantly by the viewer. These systems are usually limited to text with stationary information and do not typically have the live action of television that interests the public. Video text systems for general purpose use are expensive and usually require a micro-processor decoder at every television set. There also exist video tape cassette systems which enable a user to select a particular section of a cassette tape recording.

It is an important object of this invention to provide an improved selective television viewing system.

It is another object of the invention to achieve the preceding object with a system that uses channels available to the public.

It is a further object of the invention to achieve one or more of the preceding objects with a system that enables a viewer to select desired program material available at a remote location and have the selected material promptly available for viewing while informing the selector and others who may be interested in viewing the selection when and on which of a number of channels the selected program material may be viewed.

It is another object of the invention to achieve one or more of the preceding objects while allowing the viewer to select by telephone.

According to the invention, there is means for broadcasting television signals over a number of channels, one of which is a program schedule channel and others of which may be used for broadcasting television programs. There is computer means for scheduling channels, providing a schedule video signal for broadcasting over said program schedule channel, a signal in alphanumeric format that may be displayed on a television set designating the time and channel for broadcasting selected television program material in response to program selection signals provided from a remote location, typically by telephone or two-way cable, from a viewer wishing to see particular available program material. There are a plurality of selectable video signal sources having selectable television program material and video switching means for coupling the video signal from a selected one of said sources to a designated one of said channels. There is means for coupling switching control signals from said computing means to said video switching means for causing the video switching means to couple the selected program source to the designated viewing channel, and means for coupling selecting control signals from the computing means to the program sources to cause a selected program to be broadcast at a scheduled time.

Numerous other features, objects and advantages of the invention will become apparent from the following specification when read in connection with the accompanying drawing in which:

FIG. 1 is a block diagram illustrating the logical arrangement of a system according to the invention.

With reference now to the drawing, there is shown a block diagram illustrating the logical arrangement of a system according to the invention. It is convenient to describe the invention with respect to a cable television system; however, the principles of the invention are applicable to other multi-channel systems, such as those using microwave links to provide a number of channels to viewers. A minicomputer 11 responds to viewer selection signals provided on telephone line 12 to provide a schedule video signal on line 13 that modulates a transmitter in television transmitters 14 on dedicated program schedule channel carried by line 15 that is applied to television signal combiner 16 and broadcast with other signals having different carrier frequencies on cable 17 comprises a common transmission path to a number of remote receiving locations 18. Each remote receiving location typically has a telephone line, such as 21, connectable by telephone system 22 to telephone line 12 connected to minicomputer 11.

Minicomputer 11 also provides switching control signals over line 23 to video switches 24 that selectively couple a selected program source that may be a video tape cassette, disc or film source 25 or other television program source 26, such as scheduled programs from television broadcast stations being rebroadcast over the cable system, to designated ones of television transmitters 14 for broadcast over a selected channel determined by switching control signals on line 23. Minicomputer 11 also provides selecting control signals to the different program sources 25 and 26 to enable them to broadcast in accordance with the schedule carried by the schedule video signal on line 13 that may be viewed by viewers when a set at the remote receiving location is tuned to the program schedule channel.

Having briefly described the physical arrangement of the system, it is appropriate to consider the mode of operation. Typically, there is a printed menu of available selectable programs, each designated by a number. Alternatively, the available menu may be available in the computer and broadcast over a menu channel. A viewer at a remote location may select a program by dialing the cable station telephone number on his telephone. Telephone system 22 then connects the viewer's telephone over line 12 to minicomputer 11 which typically may respond by transmitting to the viewer a dial tone to signal the viewer to dial (or key with a touchtone phone) the number corresponding to the desired program on the menu. Minicomputer 11 stores information on the program source location, the status of the selected program source, the available channels, and the schedules for each. Assuming that the selected program is not then being broadcast, computer 11 assigns a channel, start and stop time for the selected program and provides a schedule video signal representative of it for broadcast over the program schedule channel. Each selected program is typically assigned for broadcast in the order that it is received, although it is within the principles of the invention to assign higher priorities for particular program material. For example, but in no way limiting, the selected program material might include emergency first aid information, that when selected, is scheduled for immediate broadcast. The selecting viewer tunes the television set at the remote receiving location to the program schedule channel, observes the channel and start time for broadcast of the selected program and switches the television set to that channel at or before that time. Others interested in the particular program material may observe the schedule by tuning to the program schedule channel and tune a television set at a different remote receiving location to the designated channel at the designated time without telephoning minicomputer 11.

The invention has a number of advantages. It enables an advertiser to prepare a program of sufficient length to provide an interested consumer with useful information on more complex products and services that will assist the consumer in making intelligent buying decisions. Among the products and services especially suitable for this longer presentation are automobiles, appliances, packaged travel offerings, boats, camping equipment, tools, lighting fixtures, sewing machines, sporting goods, swimming pools, home repair products, automobile repair services and others. The invention may also be useful for self-education or for making available current or other material at a library. Medical and emergency information may also be made selectively available over the system. The program material may be of any form transmitted over television systems, including full color, pictures and/or text information and/or sound.

The block diagram in FIG. 1 and the accompanying description is sufficient to enable one having ordinary skill in the computer and video system art to practice the invention. It is well within the skill of a computer programmer having ordinary skill to provide the indicated signals, arrange for storage of the menu, provide the schedule video signal and update it and respond to the telephone calls by scheduling the programs designated thereby. The selecting control signals may be provided in appropriate format for the designated program sources and might, for example, designate a specific program address or simply start, stop and rewind. In the case of a live program source or rebroadcasting a television broadcast channel, the control signal may simply designate start and stop.

Video switch 24 may take many forms, for example, a telephone cross bar switch arranged so that any of the sources may be coupled to any of the channels. Transmitters 14 and signal combiner 16 are well-known in the art.

There has been described novel apparatus and techniques for enabling viewers to conveniently select a wide variety of program material and have it promptly displayed, efficiently utilizing available channels. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Apparatus for remotely viewing selected television program material at remote receiving locations comprising, television transmitting means at a central location for providing a plurality of television signals on a plurality of channels, means at said central location for combining said television signals to provide a combined signal for transmission over a common transmission path to said remote receiving locations, means for transmitting said combined signal over said common path to said remote receiving locations, a plurality of sources of selectable television program video signals, computer means coupled to said sources and said television transmitting means and responsive to a selecting signal from a remote receiving location designating a selected television program for viewing for providing selecting control signals for enabling a corresponding one of said program sources to provide the corresponding television video signal at a predetermined time and for providing switching control signals for coupling the latter video signal for broadcast by said television transmitting means on a designated one of said channels, video switching means responsive to said switching control signals for coupling the television program video signals from the enabled sources to said television transmitting means for broadcast on designated ones of said channels, said computer means also continuously providing a schedule video signal to said television transmitting means on a predetermined program schedule channel of said channels representative of the selected television programs to be transmitted, the time of transmission and the transmission channel, whereby a viewer at a remote receiving location may tune a television receiver thereat to said program schedule channel, observe the time and channel for transmission of a selected television program and switch said television receiver to the designated channel at the designated time.

2. A method of remotely viewing selected television program material at remote receiving locations which method includes the steps of, providing at a central location a plurality of television signals on a plurality of channels, combining at said central location said television signals to provide a combined signal for transmission over a common transmission path to said remote locations, transmitting said combined signal over said common path to said remote receiving locations, enabling computer means coupled to a source of selectable television program video signals and television transmitting means for providing said plurality of television signals on said plurality of channels to respond to a selecting signal from a remote receiving location designating a selected television program for viewing to provide selecting control signals for enabling a corresponding one of said program sources to provide the corresponding television video signal at a predetermined time and for providing switching control signals for coupling the latter video signal for broadcast by said television transmitting means on a designated one of said channels, delivering said switching control signals to a video switching means for coupling the television program video signals from the enabled sources to said transmitting means for broadcast on designated ones of said channels, continuously providing with said computer means a schedule video signal to said television transmitting means on a predetermined program schedule channel of said channels representative of the selected television programs to be transmitted, the time of transmission and the transmission channel, whereby a viewer at a remote receiving location may tune a television receiver thereat to said program channel, observe the time and channel for transmission of a selected television program and switch said television receiver to the designated channel at the designated time, said viewer at said remote receiving location tuning a television receiver threat to said program schedule channel, observing a schedule of selectable television programs, observing the time of transmission and transmission channel for the latter selected television program, and switching said television receiver to the latter designated channel and observing the latter selected television program at the latter designated time.

3. A method of remotely viewing selected television program material at remote receiving locations in accordance with claim 2 and further including the step of, said viewer at said remote receiving location providing a selecting signal designating a selected television program for viewing to said computer means.

* * * * *